United States Patent Office 3,152,968
Patented Oct. 13, 1964

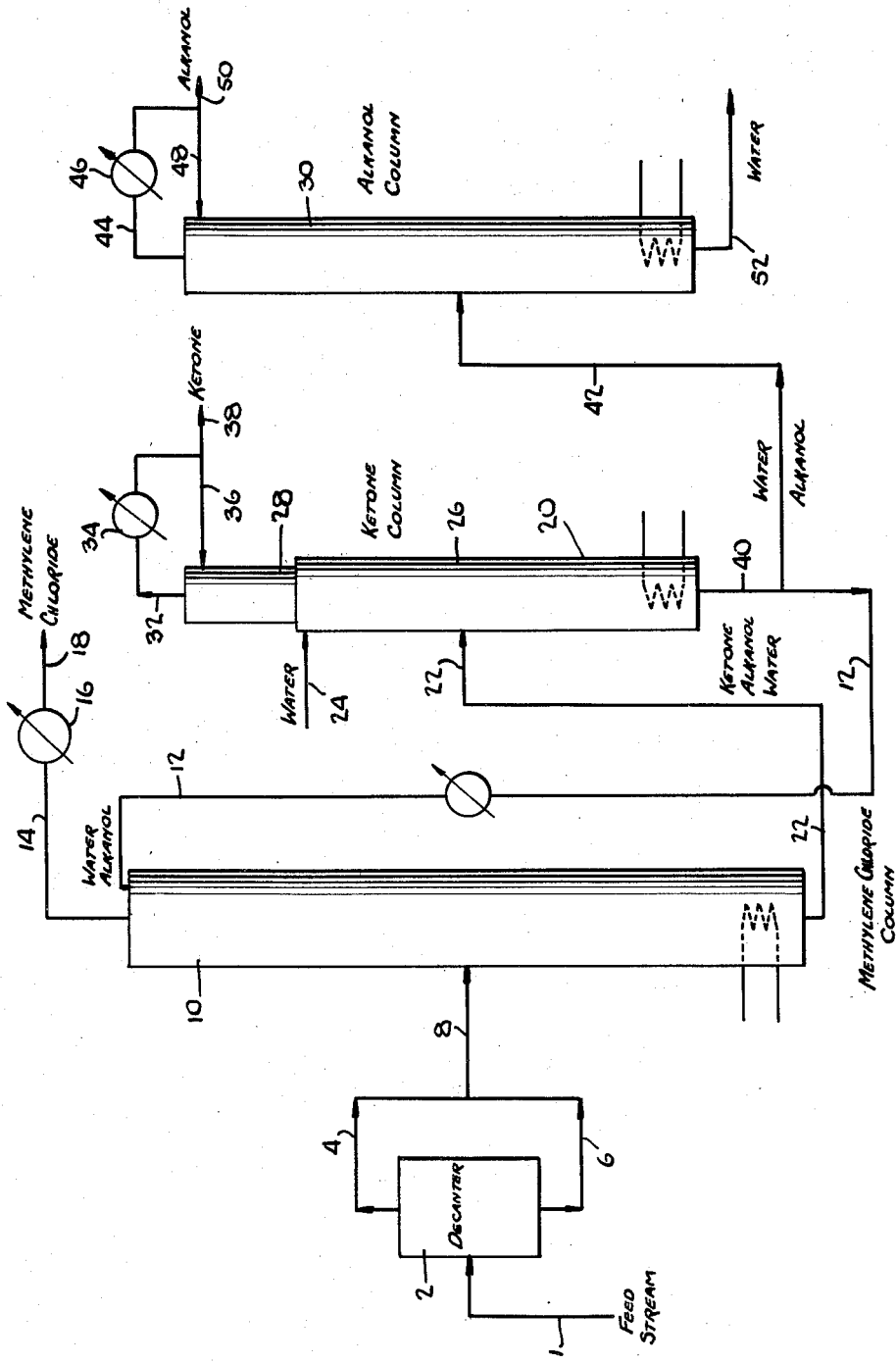

3,152,968
RECOVERY OF METHYLENE CHLORIDE FROM A MIXED SOLVENT SYSTEM BY EXTRACTIVE DISTILLATION WITH WATER
Cyril J. Kaemmerlen, Jr., Charlotte, N.C., Charles M. Oualline, Jr., San Antonio, Tex., and Albert G. Williams, Summit, N.J., assignors to Celanese Corporation of America, New York, N.Y., a corporation of Delaware
Filed June 27, 1958, Ser. No. 745,045
12 Claims. (Cl. 202—39.5)

The present invention relates to a process for the separation of the components of a mixture of methylene chloride, a lower alkanol, a lower ketone and water.

In the formation of filaments of cellulose esters such as cellulose acetate, one technique involves disssolution of the ester in a solvent and extrusion of the solution through the orifices of a device known as a spinning jet into an evaporative atmosphere. The solvent is evaporated and withdrawn while the filaments are taken up and processed in conventional manner. The vapors of solvent mixed with a large amount of air are passed through an adsorbent such as activated carbon selectively to adsorb the organic vapors. Periodically the carbon is steamed to strip the adsorbed organics from the carbon and the mixture of organic vapors and steam is treated for recovery of the solvent components in condition suitable for re-use.

When the cellulose acetate is a ripened or secondary ester having an acetyl content in the neighborhood of 54%, calculated as combined acetic acid, the solvent therefor generally is a lower ketone such as acetone. When the cellulose acetate is substantially a triester, i.e. has an acetyl content in excess of about 60%, it will not dissolve in acetone and another solvent is accordingly used, e.g. methylene chloride admixed with a lower alkanol such as methanol, ethanol, propanol, or the like.

When a plant is equipped to spin both secondary cellulose acetate and cellulose triacetate the diverse nature of the solvents complicates their recovery. Provision of separate solvent recovery systems makes for complex piping, storage vessels, controls and above all extreme care to prevent accidental mixing of solvents. Clearly, it would be desirable to employ a common vapor recovery system and a common separtion system. This expedient would appear to be impractical, however, due to the formation of close boiling azeotropes and the difficulty of separating the components from each other, e.g., methylene chloride and methanol could not be separated from acetone by fractionation even when using 75 plates and a reflux ratio of 40:1.

A further problem involved in common recovery lies in the high degree of flexibility required. It is not at all uncommon for a plant to change its products to such a degree that the secondary acetate to triacetate ratio may vary from 10:1 to 1:10 almost overnight. As a consequence any common recovery must be relatively insensitive to wide composition changes in the feed stream.

It is an object of the present invention to provide a single system wihch can separate a mixture of solvents such as are employed in the spinning of secondary cellulose acetate and cellulose triacetate.

It is a further object of the invention to provide a solvent recovery system which can separate methylene chloride, lower alkanols and lower ketones from mixtures with each other and water.

Another object is to provide a process and system for separating solvents as indicated, which process and system can be operated with feed of varying composition.

Other objects and advantages will become apparent from the following detailed description and claims, wherein all parts are by weight unless otherwise specified.

Briefly stated the instant invention comprises a three stage distillation, operated with water as an extracting agent to separate the feed mixture into a halogenated lower alkane, e.g., methylene chloride fraction, a ketone fraction and an alkanol fraction.

The process may be better understood from the following description of the drawing representing a flow diagram illustrative of a preferred arrangement of apparatus for carrying out the process.

The three columns 10, 20, 30 employed in the process can be termed respectively the methylene chloride column, the ketone column, and the alkanol column. According to the practice of this invention the starting material constitutes a solvent mixture of a halogenated lower alkane, e.g., methylene chloride, a lower alkanol, a lower ketone and water such as would be the product mixture from the solvent recovery system of a plant spinning both secondary cellulose acetate and cellulose triacetate. The mixture is fed via line 8 to some intermediate point of a conventional fractionatitng column 10 (e.g., 20–50 plates). Instead of refluxing part of the distillate, water is introduced from line 12 to the top plate in order to extractively distill the solvent mixture.

A pure water-methylene chloride azeotrope (1.5%–98.5%) passes overhead through line 14, condenses in cooler 16, and leaves the system through line 18. With a properly sized and operated fractionating column 10 the overhead contains less than 1% of ketone or alkanol, an amount which does not interfere with subsequent reemployment of the methylene chloride as a solvent. For its intended use to dissolve cellulose triacetate the methylene chloride distillate may be dehydrated in any conventional manner. Ordinarily the first step in dehydrating the methylene chloride involves stratification of the condensed distillate (from cooler 16) into water and methylene chloride layers (not shown). If desired the water layer may be returned to the top of column 10 as part of the extractant water input (not shown). This recycle feature is not illustrated because such water reflux can be but a very minor part of the water employed as extractant. From 5 to 20 moles of extractant water should be employed per mole of distillate; in contrast water is about 1.5% of the entire distillate.

An important feature of the invention is that substantially all of the methylene chloride in the feed stream from line 8 is removed as distillate. The bottoms product leaving column 10 through line 22 has less than 0.05% of methylene chloride therein. Even allowing for the high water content of the bottoms, this amounts to substantially complete separation of the methylene chloride from the mixture, and consequently substantially complete recovery thereof, i.e., over 95%.

The bottoms or kettle product from methylene chloride column 10 is passed via line 22 to ketone column 20 where an extractive distillation serves to separate the ketone out overhead as the distillate product and a mixture of water and alkanol as bottoms product. The feed line 22 enters column 20 at a suitable midpoint in the column; an extractant stream of water is added from line 24 to a plate higher up the column. Essentially the portion 26 of column 20 below the water inlet of line 24 operates as an extractive exhausting section to strip the ketone from the alkanol. The portion 28 above the point of water entry acts as an enriching rectifying section to concentrate the ketone content of the overhead product. If desired column portions 26, 28 may be separated into two appropriately connected fractionating towers. In either event the distillate passes overhead of column 20 through line 32, is condensed in cooler 34 and then divided at lines 36 and 38 into ketone reflux and product, respectively. The ketone product is over 99% in purity, and the bottoms product has less than 0.05% ketone therein. Accordingly ketone column 20 effects substantially complete separation and recovery, i.e., over 95%, of the lower ketone in the initial solvent mixture.

The water-lower alkanol bottoms mixture of column 20 is withdrawn through line 40 and passed via line 42 to alkanol column 30 where a straightforward fractionation serves to separate the mixture into its component water and alkanol fractions. The alkanol content passes overhead through line 44, condenses in cooler 46, then divides into reflux which returns to column 30 via line 48 and product which leaves via line 50. The water content withdrawn through line 52 as bottoms product is ordinarily discarded. As in columns 10 and 20 a high degree of separation is effected; substantially complete recovery of alkanol is attained. The overhead is over 99% alkanol while less than 0.05% of alkanol is present in the bottoms. In total over 80% of the lower alkanol content of the initial solvent mixture is recovered as the distillate product from column 30.

The basic process described above is preferably modified in light of conditions normally present in the solvent vapor recovery systems of cellulose acetate plants. Ordinarily the acetate is dry spun, the solvent being evaporated and recovered by adsorption. Recovery from the adsorbent through steam desorption results in a high dilution of the recovered solvent with water. While the water content would not ordinarily be less than 20%, it is usually much higher and it is not at all uncommon for the water content to exceed 90% of the recovered solvent mixture. In consequence of the initial water dilution and the necessary addition of extractant water in columns 10 and 20 the alkanol content of the water-lower alkanol bottoms mixture of column 20 is but a few percent. Advantageously it is possible to reduce the water dilution of this mixture somewhat and simultaneously facilitate recovery of alkanol by employing an internal recycle. A portion of the water-lower alkanol bottoms mixture leaving ketone column 20 through line 40 is cooled to 39° C. and passed via line 12 back to methylene chloride column 10 to serve as the water extractant, the remainder, of course, being passed via line 42 to alkanol column 30 for recovery of the alkanol content.

Employment of this internal recycle is made possible by several characteristic features of the solvent recovery problem and of the instant system. Since the methylene chloride-water azetrope distilled overhead in column 10 has but 1.5% water therein partial substitution of lower alkanol for water would amount to a minor impurity in the methylene chloride product of column 10. Moreover, the water-alkanol mixture is so highly diluted with water in the first place as to minimize carryover of alkanol. Even when the acetate plant is spinning under conditions which result in the highest concentrations of lower alkanol in the recovered solvent mixture, not more than about 5% of alkanol is present in the water-lower alkanol bottoms mixture from column 20. Tests have shown that with 3% alkanol, 97% water as extractant the alkanol content of the methylene chloride is less than 0.5%; with a pure water extractant there is substantially zero content. Moreover, since the methylene chloride is generally mixed with lower alkanol in dissolving cellulose triacetate, the presence of small amounts of alkanol in the recovered methylene chloride poses no problem.

The importance of this internal recycle can be seen from some representative figures for column 10; employing the instance of a 13 to 1 mole ratio of extractant to product and an input having 10% methylene chloride, extractant water amounts to almost 30% of the weight of feed. If fresh water were employed instead of an internal recycle, the loads on ketone column 20 and on alkanol column 30 would be increased by almost 40% and recovery of the alkanol hampered by the increased dilution.

There are numerous advantages to this process. First and foremost, the operating conditions and equipment requirements are reasonable. Methylene chloride column 10 need have as little as twenty plates and an extractant to distillate mole ratio of from 5 to 20:1 to achieve recovery of over 99% pure methylene chloride. In sharp contrast experimental efforts to recover all the methylene chloride from the same feed by straightforward fractionation were not successful even though the far more stringent conditions of 75 plates and a 40 to 1 reflux ratio were employed.

The ketone column 20 operates satisfactorily with 50 or fewer plates, preferably from 20 to 35. The mole ratio of extractant water to distillate in this column ranges from 2:1 to about 20:1 and preferably from 3:1 to 5:1. In the interest of water and heat economy, the bottoms from the alkanol column 30 may serve as this extractant.

The process is extremely flexible. Experimentation has shown that the process is relatively insensitive to such ordinarily critical factors like number of plates, feed plate location, alkanol in the extractant, feed composition, extractant to distillate ratio and even to the presence of spinning oils in the feed. In part this insensitivity is achieved by employing 25 or more plates in column 10. Thirty plates are eminently satisfactory, more than 45 plates does not appear warranted. No significant difference was noted in the column operation, and both feed conditions yielded satisfactory products when the column feed was at any location between plates 15 and 20.

The feed composition may vary between wide limits. The system has been operated with feeds corresponding to a secondary acetate:triacetate ratio ranging from 10:1 to 1:10 with no significant differences in product purities between the two extremes. This latitude permits close integration between the plant solvent recovery arrangement and the separation system. As illustrated in the drawing the feed stream, as received from steam desorption enters via line 1 into a storage vessel decanter 2 where it stratifies into a water-rich layer and a methylene chloride-rich layer. The layers are withdrawn through lines 4 and 6. Because of the operational flexibility, inherent in this distillation system, it is possible to recombine the separated layers into a single feed stream for column 10 entering from line 8. Alternately, the lower methylene chloride-rich layer withdrawn from decanter 2 through line 6 can be fed to a higher plate of column 10 than the upper water-rich layer withdrawn through line 4. If desired, the methylene chloride layer may be withdrawn altogether and only the water layer fed to column 10 for fractionation.

Spinning oils, such as are frequently employed in cellulose acetate spinning do not adversely affect operation of this system. Only minute quantities of oil (2 p.p.m.) were found in the methylene chloride distillate when 2% (wt. based on the organic feed) was added to the feed stream. Thus the oil was not carried over into the distillates and its presence did not adversely affect column operations.

Similarly it has been found that the variations in feed do not affect operation of the ketone and alkanol columns 20, 30. Actually the composition variations have been so diminished by the water recycle and by removal of the methylene chloride that the variations are lesser in magnitude than in column 10 and present no serious problem to operation of columns 20, 30. It has been found that any solvent mixtures containing 20–98.5% of water, and preferably from 30–95% water, and at least ½% of each of the three organic components can be effectively separated in a distillation plant operated according to the instant invention with substantial recovery of pure ketone, alkanol and methylene chloride.

The relative proportions of the organic components of the initial feed can be varied widely, as indicated. Preferably, however, the proportion of methylene chloride to lower alkanol ranges from about 6–30:1 and the ratio of lower ketone to methylene chloride plus lower alkanol preferably ranges from 7.3:1 to 1:13.7, i.e. the preferred ratio of lower ketone:methylene chloride:lower alkanol is 1:13.3–0.12:2–0.004.

While the invention has been described with reference to methylene chloride, other halogenated lower alkanes which dissolve cellulose triacetate can be employed. In place of methanol, other water-soluble lower alkanols such as ethanol, isopropanol, and the like can be employed and the lower ketones, such as methylethylketone, can be substituted for the acetone.

The following examples are given to illustrate this invention further.

*Example I*

A two phase mixture of water, acetone, methylene chloride and methanol fed at the bubble point to column 10 was 70% water, the organic balance had a ratio acetone to methylene chloride to methanol 1.0:4.91:0.54. This feed entered plate 20 of a 30 plate column at the rate of 21 parts per minute. A 3% methanol solution in water extractant entered plate 30 (top plate) at the rate of 14.5 parts per minute. Methylene chloride was distilled overhead at the rate of 4.8 parts per minute. The balance was withdrawn from the bottom at the reboiler temperature of 91° C. and passed to plate 15 of a 35 plate ketone column. Fresh water (extractant) at the rate of 3.76 parts per minute was added to plate 20 and a 10/1 reflux ratio was employed, to rectify the acetone in portion 28 of column 20. The acetone product was withdrawn at the rate of 0.977 part per minute, and the balance withdrawn as bottoms at the reboiler temperature of 98.5° C., then divided into two portions.

One portion amounting to 14.5 parts per minute was cooled to 39° C. then recycled (through line 12) to the methylene chloride column 10 and the other portion of 19 parts per minute was passed to plate 15 of a 30 plate column where it was fractionated with a 5:1 reflux ratio. The methanol product of ½ part per minute was withdrawn overhead and the balance was withdrawn from the kettle of column 30 and discarded.

The distillate product from each column was over 99% in purity. Over a 95% recovery rate was attained for the methylene chloride and acetone and over 90% of the methanol was recovered.

*Example II*

A two phase mixture of water, acetone, methylene chloride, and methanol fed at the bubble point to column 10 was 70% water, the organic balance had a ratio of acetone:methylene chloride:methanol of 1:0.6:0.067. This feed entered at plate 20 of a 30 plate column at the rate of 41.5 parts per minute. The distillate was removed at the rate of 4.55 parts per minute, and the balance was withdrawn at a reboiler temperature of 77° C. then fed to the 15th plate of a 35 plate ketone column. Fresh water extractant at the rate of 5.2 parts per minute was added to plate 20 and a 3 to 1 reflux ratio was employed to rectify the acetone in the top 15 plates of the column. The acetone product was withdrawn at the rate of 7.5 parts per minute. The balance was withdrawn as bottoms at the reboiler temperature of 99° C., then divided into two portions.

One portion of 13.5 parts per minute was cooled to 39° C. then recycled (through line 12) to the methylene chloride column 10 and the other portion of 34.75 parts per minute passed to plate 15 of a 30 plate methanol column where it was fractionated with an 8:1 reflux ratio. The methanol product of ½ part per minute was withdrawn overhead and the waste water was withdrawn from the bottom of column 30 and discarded.

The distilled product from each column was over 99% in purity and over a 95% recovery rate was attained.

It is to be understood that the foregoing detailed description is given merely by way of illustration and that many variations may be made therein without departing from the spirit of our invention.

Having described our invention what we desire to secure by Letters Patent is:

1. A distillation process which comprises: introducing a mixture of water, lower ketone, methylene chloride and lower alkanol at an intermediate location of a distillation zone, adding water in place of reflux at the top of said distillation zone, whereby the feed mixture is extractively distilled, removing overhead a methylene chloride-water azeotrope in high purity and removing a mixture of water, lower ketone and lower alkanol substantially free from methylene chloride as bottoms: and thereafter separating the bottoms mixture.

2. The process of claim 1 wherein the water added as extractant comprises a dilute mixture of lower alkanol recycled from subsequent removal of said lower ketone from the bottoms mixture.

3. The process of claim 1 wherein the water is added as extractant at the rate of 5–20 moles of water per mole of methylene chloride distillate.

4. The process of claim 1 wherein the initial mixture contains from about 20–98.5% by weight of water, the weight ratio of methylene chloride to lower alkanol ranging from about 6–30:1 and the weight ratio of lower ketone to methylene chloride plus lower alkanol ranging from 7.3:1 to 1:13.7.

5. A distillation process which comprises: introducing a mixture of water, lower ketone, methylene chloride and lower alkanol at an intermediate location of a distillation zone, adding water in lieu of reflux at the top of said distillation zone, removing overhead the methylene chloride-water azeotrope in high purity, removing a mixture of water, lower ketone and lower alkanol substantially free of methylene chloride as bottoms, feeding said bottoms product to a second distillation zone at an intermediate point thereof, adding water to said second distillation zone above the point of feed and adding reflux at the top thereof, whereby the lower ketone is removed overhead in high purity and a mixture of water and lower alkanol is removed substantially free of lower ketone as bottoms, and fractionating the water-lower alkanol bottoms mixture to recover therefrom the lower alkanol.

6. The process of claim 5 wherein a portion of the water-lower alkanol bottoms mixture removed from the second distillation zone is cooled and recycled back to the first-named distillation zone as the water added to the top thereof.

7. The process of claim 5 wherein the water added at the top of the first-named distillation zone is employed in a ratio of from 5 to 20 moles per mole of distillate.

8. A distillation process for separating a solvent mixture recovered from cellulose acetate spinning operations, said solvent mixture comprising from 30 to 95% water, the balance being acetone, methylene chloride and methanol which comprises: (1) extractively distilling the solvent mixture against a water reflux to remove a bottoms mixture of water, acetone and methanol; (2) extractively distilling the bottoms mixture with added water to remove acetone overhead and a water-methanol mixture substantially free of acetone as bottoms; (3) fractionating the acetone overhead of the acetone extractive distillation to recover a substantially pure acetone distillate; and (4) fractionating the water-methanol bottoms product to recover a substantially pure methanol distillate.

9. The process of claim 8 wherein a portion of the water-methanol bottoms product is cooled and then recycled to form the water reflux for the extractive distillation of the initial solvent mixture, the recycle being in an amount ranging from 5–20 moles of water per mole of methylene chloride distillate.

10. The process of claim 8 wherein the initial solvent mixture constitutes two phases, namely, an aqueous phase and a methylene chloride phase, and the two phases are introduced at the same location in the distillation zone.

11. The process of claim 8 wherein the weight ratio of methylene chloride to methanol ranges from about 6–30:1 and the weight ratio of acetone to methylene chloride plus methanol ranges from 7.3:1 to 1:13.7.

12. The process of claim 8 wherein prior to the first extractive distillation the feed is permitted to stratify into a methylene chloride-rich layer and an aqueous layer, these layers being separately fed to the column in which the first extractive distillation is effected, the methylene chloride-rich layer being fed to a higher plate of said column than said aqueous layer.

References Cited in the file of this patent

UNITED STATES PATENTS

| | | |
|---|---|---|
| 1,990,625 | Walter et al. | Feb. 12, 1935 |
| 2,421,441 | Thronson et al. | June 3, 1947 |
| 2,704,271 | Harrison et al. | Mar. 15, 1955 |
| 2,751,337 | Goddin et al. | June 19, 1956 |
| 2,755,312 | Thomas | July 17, 1956 |
| 2,791,550 | West et al. | May 7, 1957 |
| 2,856,331 | Rosenthal et al. | Oct. 14, 1958 |

OTHER REFERENCES

Horsley: "Azeotropic Data," July 23, 1953, page 6.